United States Patent
Shin et al.

(10) Patent No.: US 12,527,513 B2
(45) Date of Patent: Jan. 20, 2026

(54) APPARATUS AND METHOD FOR MEASURING LEVEL OF BRAIN CELL ACTIVITY UNDER INDUCED ARTIFICIAL BLOOD CIRCULATION

(71) Applicant: SEOUL NATIONAL UNIVERSITY R&DB FOUNDATION, Seoul (KR)

(72) Inventors: Sang Do Shin, Seoul (KR); Hee Chan Kim, Seoul (KR); Hee Jin Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 952 days.

(21) Appl. No.: 16/651,883

(22) PCT Filed: Sep. 5, 2018

(86) PCT No.: PCT/KR2018/010342
§ 371 (c)(1),
(2) Date: Mar. 27, 2020

(87) PCT Pub. No.: WO2019/066283
PCT Pub. Date: Apr. 4, 2019

(65) Prior Publication Data
US 2020/0229723 A1 Jul. 23, 2020

(30) Foreign Application Priority Data
Sep. 29, 2017 (KR) .......... 10-2017-0127470

(51) Int. Cl.
*A61B 5/374* (2021.01)
*A61M 1/36* (2006.01)

(52) U.S. Cl.
CPC .......... *A61B 5/374* (2021.01); *A61M 1/3666* (2013.01)

(58) Field of Classification Search
None
See application file for complete search history.

(56) References Cited

U.S. PATENT DOCUMENTS

| 2014/0324763 A1 | 10/2014 | Lurie et al. | |
| 2015/0065906 A1* | 3/2015 | Victor | A61B 5/14542 600/544 |
| 2015/0257674 A1* | 9/2015 | Jordan | A61B 5/291 600/383 |

FOREIGN PATENT DOCUMENTS

| JP | 2012-161375 A | 8/2012 |
| KR | 10-2001-0095605 A | 11/2001 |

(Continued)

OTHER PUBLICATIONS

Foreman et al. (Quantitative EEG for the detection of brain ischemia; Critical Care 2012, 16:216) (Year: 2012).*

(Continued)

*Primary Examiner* — Jay B Shah
(74) *Attorney, Agent, or Firm* — Rabin & Berdo, P.C.

(57) ABSTRACT

An apparatus for measuring brain cell activity in artificial blood circulation according to an embodiment of the present invention may include a measuring unit (10) that measures EEG signals; an analog-to-digital converter (ADC) 20 that converts the EEG signals measured at the measuring unit 10 into digital signals; a control unit 50 that calculates EEG parameters from the digital EEG signals converted at the ADC 20, and calculates end-tidal carbon dioxide tension and cerebral blood flow from the EEG parameters.

8 Claims, 5 Drawing Sheets

(56) References Cited

FOREIGN PATENT DOCUMENTS

KR         10-1400362 B1      5/2014
KR    10-2016-0146462 A     12/2016

OTHER PUBLICATIONS

Kotodziej (Matlab FE_Toolbox—an universal utility for feature extraction of EEG signals for BCI realization; 2010 Przegląd Elektrotechniczny (Electrical Review), ISSN 0033-2097, R. 86 NR Jan. 2010) (Year: 2010).*

* cited by examiner

APPARATUS AND METHOD FOR MEASURING LEVEL OF BRAIN CELL ACTIVITY UNDER INDUCED ARTIFICIAL BLOOD CIRCULATION

TECHNICAL FIELD

The present invention relates to an apparatus and method for measuring brain cell activity in artificial blood circulation, and, to an apparatus and method for measuring the brain cell activity using electroencephalography (EEG) and end-tidal carbon dioxide tension and cerebral blood flow, which measure and analyze, in real-time, EEG of a patient in an artificial circulation to determine degree of brain tissue revival and indicate the result by numbers in a specific range.

BACKGROUND ART

A cardiac arrest occurs in a critically ill patient when the heart, which is in charge of the circulation of blood flow throughout the body, fails to function. Within a few minutes in the cardiac arrest state where blood flow is not circulating, the irreversible damage to the brain or heart occurs, leading to death of the patient. Accordingly, to prevent this, treatment such as cardiopulmonary resuscitation is performed, or a device such as an extra-corporeal membrane oxygenation (ECMO) is used. The above treatment and equipment will lead to artificial blood circulation, which means blood circulation generated by an artificial circulation-inducing device inside the human body or a physical chest compression-inducing device outside the human body, rather than blood circulation by the spontaneous contraction of the heart. In such an emergency situation, artificially circulating oxygen-containing blood is an important issue directly related to the survival of the patient, and thus, studies on the extent of the proper circulation of artificially induced blood have been widely conducted.

For example, during cardiopulmonary resuscitation, the depth, or number of chest compressions are measured in real time using an accelerometer, and if it is less than a reference value, a sound output is generated using a metronome to guide so that the cardiopulmonary resuscitation is performed under the optimal condition that is set to the reference value. For general adults, there are guidelines for cardiopulmonary resuscitation such as 100 to 120 times per minute, 5 centimeters in depth, and so on. However, these guidelines do not always guarantee optimal body circulation. Even the chest compressions of the same conditions can result in varying effect of blood circulation in the patient's body depending on the depth or location of chest compressions, the body condition of the patient, and the like.

Therefore, in order to evaluate the actual effect of artificial circulation, it is necessary to immediately monitor the physiological changes of the patient. Blood pressure and blood flow may be the representative indicators, but surgical measures are required to measure them. In particular, considering that it is difficult to perform such invasive measures in an emergency rescue environment, a simpler bio-signal measurement and processing method is needed. In the meantime, the brain cell activity, which indicates the degree that the physiological or biochemical function of the brain cells is maintained, is of great significance because, when measured, it enables evaluation of the adequacy of artificial blood circulation in the main organs which are the targets of actual artificial blood circulation.

The contents described in the background art are written to facilitate understanding of the background of the invention, and may include matters other than those already known to those skilled in the art.

DISCLOSURE

Technical Problem

The present invention has been made to solve the problems mentioned above, and it is an object of the present invention to provide an apparatus and method for measuring brain cell activity in artificial blood circulation state in real time using electroencephalography (EEG).

Technical Solution

An apparatus for measuring brain cell activity in artificial blood circulation according to an embodiment of the present invention may include a measuring unit (10) that measures EEG signals; an analog-to-digital converter (ADC) 20 that converts the EEG signals measured at the measuring unit 10 into digital signals; a control unit 50 that calculates EEG parameters from the digital EEG signals converted at the ADC 20, and calculates end-tidal carbon dioxide tension and cerebral blood flow from the EEG parameters.

The EEG parameters may include a burst suppression ratio (BSR), a delta ratio, a beta ratio, a 95% power spectrum frequency (SEF95), a ratio of gamma power to total power spectral power (GammaPR), and a ratio of theta power to total power spectral power (ThetaPR), a power ratio of a high frequency component of 40 Hz or higher to total power spectral power (ExtraPR), and a degree of phase matching (SynchFastSlow).

An embodiment may additionally include a band pass filter 30 that passes a signal of a specific frequency band among the digital EEG signals converted through the ADC 20; and a band blocking filter 40 that blocks a signal of a specific frequency band among the digital EEG signals converted through the ADC 20.

The digital EEG signals may be segmented and analyzed in units of a predetermined length, and the segmented digital EEG signals may be subjected to one or more preprocessing processes selected from among time domain and frequency domain preprocessing processes to calculate the EEG parameters.

The burst suppression ratio (BSR) may represent a ratio of silence in a unit time slice of an EEG on a time domain.

The beta ratio may represent a ratio of a sum of spectral powers of a specific frequency band of the EEG with respect to a sum of spectral powers of another specific frequency band of the EEG, on a frequency domain.

The delta ratio may represent a ratio of a sum of spectral powers of a specific frequency band of the EEG with respect to a sum of spectral powers of another specific frequency band of the EEG, on a frequency domain.

The ratio of theta power to total power spectral power (ThetaPR) may represent a ratio of a sum of spectral powers of a specific frequency band of the EEG with respect to a sum of spectral powers of another specific frequency band of the EEG, on a frequency domain.

The ratio of gamma power to total power spectral power (GammaPR) may represent a ratio of a sum of spectral powers of a specific frequency band of the EEG with respect to a sum of spectral powers of another specific frequency band of the EEG, on a frequency domain.

The power ratio of a high frequency component of 40 Hz or higher to total power spectral power (ExtraPR) may represent a ratio of a sum of spectral powers of a specific frequency band of the EEG with respect to a sum of spectral powers of another specific frequency band of the EEG, which is different from the GammaPR, on a frequency domain.

The 95% power spectrum frequency (SEF95) may represent represents a sum of spectral powers of a specific frequency band of the EEG on a frequency domain.

The degree of phase matching (SynchFastSlow) may represent a ratio of a sum of bispectral powers of a specific frequency band of the EEG with respect to a sum of bispectral powers of another specific frequency band of the EEG, on a bispectral domain.

The control unit 50 may establish a statistical model capable of determining a relationship between the EEG parameters and the end-tidal carbon dioxide tension and the cerebral blood flow, and then score the EEG parameters, and then combine the results to calculate the end-tidal carbon dioxide tension.

An embodiment may additionally include an output unit which may output a brain cell activity of a patient through the end-tidal carbon dioxide tension and the cerebral blood flow, or calculate a variance of the calculated end-tidal carbon dioxide tension and cerebral blood flow and output a quality of a current purifying action, or predict a future situation through a moving average processing of the variance.

According to another embodiment of the present invention, a method of measuring brain cell activity in artificial blood circulation may be provided, which may include measuring EEG signals; converting the EEG signals into digital signals; calculating EEG parameters from the converted digital EEG signals; and calculating an end-tidal carbon dioxide tension and a cerebral blood flow from the EEG parameters.

An embodiment may additionally include: passing, through a band pass filter 30, a signal of a specific frequency band among the digital EEG signals converted through the ADC 20; and blocking, through a band blocking filter 40, a signal of a specific frequency band among the digital EEG signals converted through the ADC 20.

The digital EEG signals may be segmented and analyzed in units of a predetermined length, and the segmented digital EEG signals may be subjected to one or more preprocessing processes selected from among time domain and frequency domain preprocessing processes to calculate the EEG parameters.

The calculating the end-tidal carbon dioxide tension and the cerebral blood flow from the EEG parameters may include establishing a statistical model capable of determining a relationship between the EEG parameters and the end-tidal carbon dioxide tension and the cerebral blood flow, and then scoring the EEG parameters, and then combining the results to calculate the end-tidal carbon dioxide tension.

The EEG parameters may include a burst suppression ratio (BSR), a delta ratio, a beta ratio, a 95% power spectrum frequency (SEF95), a ratio of gamma power to total power spectral power (GammaPR), and a ratio of theta power to total power spectral power (ThetaPR), a power ratio of a high frequency component of 40 Hz or higher to total power spectral power (ExtraPR), and a degree of phase matching (SynchFastSlow).

The burst suppression ratio (BSR) may represent a ratio of silence in a unit time slice of an EEG on a time domain.

The beta ratio may represent a ratio of a sum of spectral powers of a specific frequency band of the EEG with respect to a sum of spectral powers of another specific frequency band of the EEG, on a frequency domain.

The delta ratio may represent a ratio of a sum of spectral powers of a specific frequency band of the EEG with respect to a sum of spectral powers of another specific frequency band of the EEG, on a frequency domain.

The ratio of theta power to total power spectral power (ThetaPR) may represent a ratio of a sum of spectral powers of a specific frequency band of the EEG with respect to a sum of spectral powers of another specific frequency band of the EEG, on a frequency domain.

The ratio of gamma power to total power spectral power (GammaPR) may represent a ratio of a sum of spectral powers of a specific frequency band of the EEG with respect to a sum of spectral powers of another specific frequency band of the EEG, on a frequency domain.

The power ratio of a high frequency component of 40 Hz or higher to total power spectral power (ExtraPR) may represent a ratio of a sum of spectral powers of a specific frequency band of the EEG with respect to a sum of spectral powers of another specific frequency band of the EEG, which is different from the GammaPR, on a frequency domain.

The 95% power spectrum frequency (SEF95) may represent represents a sum of spectral powers of a specific frequency band of the EEG on a frequency domain.

The degree of phase matching (SynchFastSlow) may represent a ratio of a sum of bispectral powers of a specific frequency band of the EEG with respect to a sum of bispectral powers of another specific frequency band of the EEG, on a bispectral domain.

An embodiment may additionally include: outputting, through an output unit, the end-tidal carbon dioxide tension and the cerebral blood flow; or generating a warning through a warning unit, when the end-tidal carbon dioxide tension and the cerebral blood flow are out of a set range.

Advantageous Effects

According to an apparatus and method for measuring brain cell activity in artificial blood circulation according to an embodiment of the present invention as described above, it is possible to provide end-tidal carbon dioxide tension (ETCO2) and cerebral blood flow (CBF) from a burst suppression ratio (BSR), a delta ratio, a beta ratio, a 95% power spectrum frequency (SEF95), a ratio of gamma power to total power spectral power (GammaPR), and a ratio of theta power to total power spectral power (ThetaPR), a power ratio of a high frequency component of 40 Hz or higher to total power spectral power (ExtraPR), and the like, as acquired from EEG signals.

The end-tidal carbon dioxide tension is used as a key indicator to evaluate the effectiveness of an artificial systemic circulation. The body produces carbon dioxide as a by-product of cellular respiration, and the carbon dioxide moves through the blood into the alveoli and expelled during exhalation. If the blood circulation is not smooth, the amount of carbon dioxide delivered to the alveoli decreases and so the amount thereof expelled at the end of breath decreases. The end-tidal carbon dioxide tension is an indicator that reflects cell metabolism, which is the process of the cells processing oxygen and nutrients to maintain life, and is a useful indicator to show the degree of recovery of body circulation. Generally, the end-tidal carbon dioxide tension is measured through intubation, but according to the present invention, it is possible to easily evaluate the effect of artificial circulation by calculating the end-tidal carbon dioxide tension through EEG analysis.

In addition, the present invention can estimate cerebral blood flow as a hemodynamic index. In order for the brain to function normally, oxygen and glucose need to be constantly supplied. Steady-state cerebral blood flow requires blood containing 50 to 60 mL/min of oxygen and glucose per 100 mg of brain tissue, and for the entire brain, about 700 to 840 mL/min of blood flow is required. In order to prevent brain death, it is required that the cerebral blood flow is maintained above a certain range, and according to the present invention, high cerebral blood flow can be induced by measuring brain cell activity and calculating cerebral blood flow during artificial circulation.

BEST MODE

Figure 1:
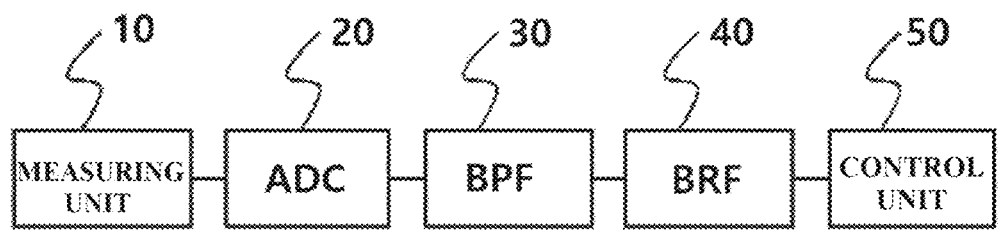
FIG. 1 is a block diagram showing a configuration of an apparatus for measuring brain cell activity using EEG, end-tidal carbon dioxide tension and cerebral blood flow according to an embodiment of the present invention.

An apparatus for measuring brain cell activity in artificial blood circulation according to the present invention includes a measuring unit 10 for measuring EEG signals; an analog-to-digital converter (ADC) 20 that converts the EEG signals measured at the measuring unit 10 into digital signals, and a control unit 50 that calculates EEG parameters from the digital EEG signals converted at the ADC 20, and calculates an end-tidal carbon dioxide tension and a cerebral blood flow from the EEG parameters.

Detailed Description

Hereinafter, preferred embodiments of the present disclosure will be described in detail with reference to the accompanying drawings, that will be readily apparent to those skilled in the art to which the present disclosure pertains. However, the present invention may be implemented in many different forms and is not limited to the embodiments described herein.

Throughout the description, when a portion is stated as "comprising (including)" an element, unless specified to the contrary, it intends to mean that the portion may additionally include another element, rather than excluding the same.

For the sake of clarity in describing the present invention, parts irrelevant to the description are omitted, and the same reference numerals are assigned to the same or similar elements throughout the description.

Additionally, some methods may be implemented by at least one control unit.

The term "control unit" refers to a hardware device comprising a memory and a processor adapted to execute one or more steps interpreted as an algorithmic structure.

The memory is adapted to store algorithmic steps, and the processor is specifically configured to execute the algorithmic steps to perform one or more of the processes described below.

Furthermore, a control logic according to the present invention may be embodied in a non-transitory, computer-readable medium on a computer-readable means including executable program instructions executed by a processor, control unit, or the like.

Examples of the computer-readable means include, but are not limited to, ROM, RAM, CD-ROM, magnetic tape, floppy disk, flash drive, smart card and optical data storage.

A computer-readable reproduction medium may be distributed in a networked computer system, and stored and executed in a distributed manner by a telematics server or a control unit area network (CAN), for example.

Hereinafter, a configuration of an apparatus for measuring brain cell activity cells using EEG, end-tidal carbon dioxide tension and cerebral blood flow according to an embodiment of the present invention will be described in detail with reference to the accompanying drawings.

The drawings of the present invention are provided for reference to explain exemplary embodiments of the present invention, and therefore, the technical spirit of the present invention should not be construed as being limited to the accompanying drawings.

FIG. 1 is a block diagram showing a configuration of an apparatus for measuring brain cell activity using EEG, end-tidal carbon dioxide tension and cerebral blood flow according to an embodiment of the present invention.

As shown in FIG. 1, the apparatus for measuring brain cell activity using the EEG, end-tidal carbon dioxide tension and cerebral blood flow (hereinafter referred to as the "apparatus for measuring brain cell activity") according to an embodiment of the present invention includes a measuring unit 10 that measures EEG signals; an analog-to-digital converter (ADC) 20 that converts the EEG signals measured at the measuring unit 10 into digital signals; and a control unit 50 that calculates end-tidal carbon dioxide tension (ETCO2) and brain blood flow (CBF) from the digital signals converted from EEG. The apparatus for measuring brain cell activity according to an embodiment of the present invention may further include a band pass filter 30 that passes a signal of a specific frequency band among digital EEG signals converted through the ADC 20. The frequency range of the EEG used in the embodiment of the present invention is 0.5 to 47 Hz. Therefore, the band pass filter 30 is used to extract only the EEG of the frequency band in the range of 0.5 to 47 Hz from the original raw EEG.

In addition, the apparatus for measuring brain cell activity may further include a band blocking filter 40 that blocks a signal of a specific frequency band among the digital EEG signals converted through the ADC 20.

Figure 2:
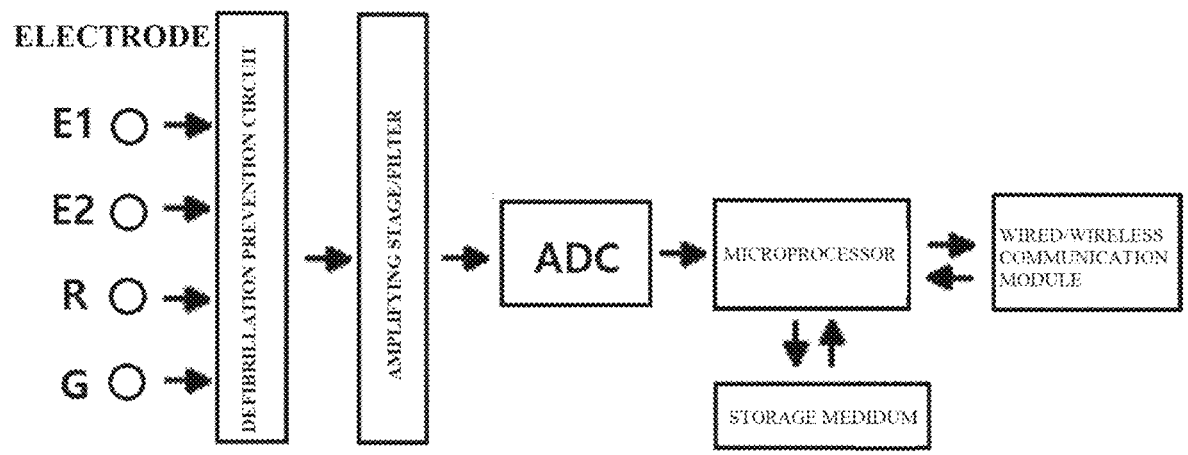
FIG. 2 is a conceptual diagram showing a configuration of a measuring unit and a control unit according to an embodiment of the present invention.

Referring to FIG. 2, the EEG signals collected from the electrode pass through a defibrillation prevention circuit, an amplifying stage, and an analog filter in turn. Then after being converted into digital signals through a high-performance analogue-to-digital converter (ADC), the signals are inputted to the control unit (e.g., microprocessor). The microprocessor may perform filtering, EBRI calculation, and the like, and store the result in a storage medium or transmit it to a peripheral device through a communication module.

Figure 3:
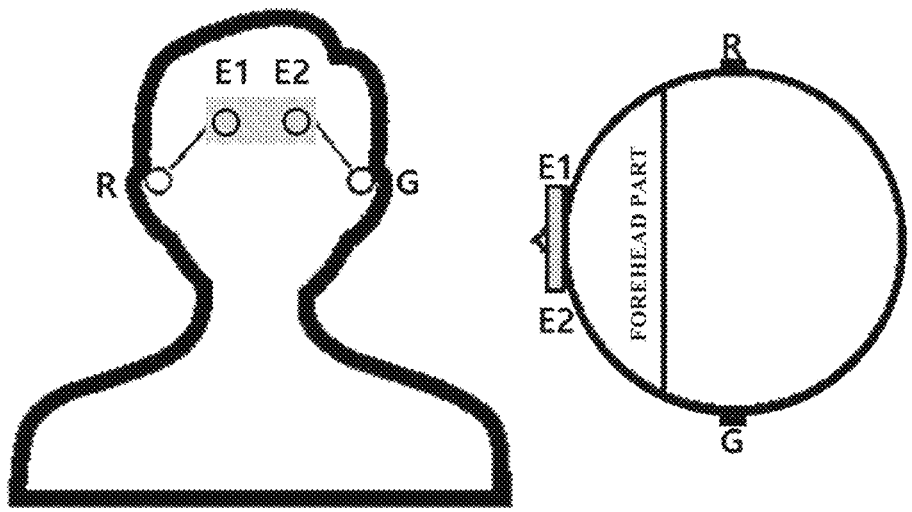
FIG. 3 is a diagram showing a method for attaching the measuring unit according to an embodiment of the present invention.

Referring to FIG. 3, a method for measuring EEG signals on the forehead is shown, although measurement from other points is also possible. For EEG measurement, a cap-electrode may be worn over the entire head or an electrode may be attached to any point on the head. An electrode wire may be connected between the electrode and an external EEG signal measuring device. Alternatively, the EEG measuring device may be directly attached to the human body to prevent the electrode wire from shaking. The reason for attaching the EEG measuring device to the forehead is to prevent noise caused by the shaking of the electrode wire. E1 denotes an active electrode 1, E2 is an active electrode 2, R is a reference electrode, and G is a ground electrode.

The control unit 50 calculates, from the digital EEG signals converted at the ADC 20, EEG parameters that include a burst suppression ratio (BSR), a delta ratio, a beta ratio, a degree of phase matching (SynchFastSlow), a 95% power spectrum frequency (SEF95), a ratio of gamma power to total power spectral power (GammaPR), and a ratio of theta power to total power spectral power (ThetaPR), and a power ratio of a high frequency component of 40 Hz or higher to total power spectral power (ExtraPR). The control unit 50 may be driven with an external power supply. Alternatively, it may be driven through an internal battery, and the battery may be charged by wire or wirelessly to be used.

Before calculating the EEG parameters, a signal quality index (SQI) may be considered. SQI is expressed as an integer between 0 and 100, and given in unit of %. The higher SQI indicates the higher quality. The digitized EEG signals may be segmented and analyzed on the basis of a unit of a specific length, and the user may select the specific length, such as, 2 seconds, 4 seconds, and the like, for the segmentation and analysis.

When the correlation between the magnitude of the EEG of the unit time slice (epoch) and EOG used as the reference is recorded to be equal to, or greater than the reference value, the SQI may be regarded as 0 and the parameter calculation process for the EEG signals of the unit time slice may be omitted.

Meanwhile, when the correlation between the EEG and the EOG is less than the reference value, the ratio of when the magnitude of the original EEG data does not exceed a specific range may be defined as the SQI. The specific range may be defined as ±200 uV or ±150 uV, considering the magnitude of the EEG of a normal person.

When all EEG signals within a unit time slice exist within the specific range, the SQI at this time is defined as 100%. If the SQI satisfies the specific reference, the end-tidal carbon dioxide tension and the cerebral blood flow are calculated using the EEG parameters.

The segmented EEG signals may be subjected to preprocessing processes. For example, the time domain preprocessing process such as baseline correction or linear trend removal technique, or the frequency domain preprocessing process such as Blackman window processing may be performed.

To this end, the control unit 50 may be provided with one or more processors operated by a set program, and the set program is configured to perform each step of a method for measuring brain cell activity according to an embodiment of the present invention. The detected EEG signals may be subjected to signal processing at the control unit and then inputted. The signal processing circuit may include a defibrillation prevention circuit or an ESD antistatic circuit. The analog EEG signals may be converted into digital EEG signals through the ADC of the control unit so that the brain cell activity can be transmitted to the control unit. Alternatively, without the ADC, the brain cell activity may be transmitted to the control unit in analog signals.

In this example, the burst suppression ratio (BSR) is calculated through a time domain analysis process of the measured EEG. In the time domain, it means the ratio of silence within the unit time slice of the EEG. In general, the magnitude of the EEG of a normal person who is awake has a maximum level of 100 to 150 uV, and the magnitude of the EEG is reduced as he or she falls asleep or falls into anesthesia. The control unit 50 continuously monitors the length of the suppressed EEG (flat EEG) maintained below ±5 uV, and calculates the BSR by analyzing the case where the length of the suppressed EEG is 0.5 seconds or longer. The presence of BSR means a low brain activity state.

The delta ratio may represent a ratio of a sum of spectral powers of a specific frequency band of the EEG with respect to a sum of spectral powers of another specific frequency band of the EEG, on a frequency domain. In an embodiment of the present invention, the delta ratio may be defined as a ratio of a sum of frequency spectral powers in the 1 to 4 Hz band with respect to a sum of frequency spectral powers in the 8 to 20 Hz band.

The beta ratio may represent a ratio of a sum of spectral powers of a specific frequency band of the EEG with respect to a sum of spectral powers of another specific frequency band of the EEG, on a frequency domain. In an embodiment of the present invention, the beta ratio may be defined as a ratio of a sum of frequency spectral powers in the 11 to 20 Hz band with respect to a sum of frequency spectral powers in the 30 to 47 Hz band. That is, the frequency bands of EEG for calculating the delta ratio and the beta ratio are different from each other.

The 95% power spectrum frequency (SEF95) may be defined as a frequency corresponding to 95% of the total frequency spectral power, when summing the frequency spectral powers in a direction increasing from the starting frequency of the bandwidth.

The ratio of theta power to total power spectral power (ThetaPR) may be defined as a ratio between the total frequency spectral power and the frequency spectral power in the 4 to 8 Hz band. The ratio of gamma power to total power spectral power (GammaPR) may be defined as a ratio between the total frequency spectral power and the frequency spectral power in the 30 to 47 Hz band. That is, the frequency bands for calculating the ThetaPR and the GammaPR are different from each other.

The power ratio of the high frequency component of 40 Hz or higher to the total power spectral power (ExtraPR) may be defined as a ratio between the total frequency spectral power and the frequency spectral power in the band of 40 Hz or higher.

The SynchFastSlow, or Relative Synchrony of Fast and Slow Wave, may represent a ratio of a sum of bispectral powers of a specific band with respect to a sum of bispectral powers of another specific band in a bispectral domain. In an embodiment of the present invention, the SynchFastSlow may be defined as a ratio of a magnitude of bispectral powers in the range of 0.5 to 47 Hz with respect to a magnitude of bispectral powers in the range of 40 to 47 Hz.

In actual clinical practice, the quality of body circulation is evaluated through the end-tidal carbon dioxide tension. Therefore, according to an embodiment of the present invention, the control unit 50 calculates the end-tidal carbon dioxide tension and the cerebral blood flow using the burst suppression ratio (BSR), the delta ratio, the beta ratio, the 95% power spectrum frequency (SEF95), the ratio of gamma power to total power spectral power (GammaPR), and the ratio of theta power to total power spectral power (ThetaPR), the power ratio of a high frequency component of 40 Hz or higher to total power spectral power (ExtraPR), and the degree of phase matching (SynchFastSlow).

To this end, it is necessary to assign scores to the previously obtained EEG parameters and appropriately combine them to express a separate logic for calculating the end-tidal carbon dioxide tension and the cerebral blood flow. According to the present invention, the logic for determining the relationships between the EEG and the end-tidal carbon dioxide tension and between the EEG and the cerebral blood flow may be derived through regression analysis. Specifically, it may be derived through the stepwise regression, which is a method of examining the importance of the parameters to be used in the regression model among various explanatory parameters (independent parameters) and removing the insignificant parameter. Alternatively, the logic may be derived through Least Absolute Shrinkage and Selection Operator (LASSO) regression analysis that complements the independence between the explanatory parameters through the process of adding or dropping parameters when there is a correlation between the explanatory parameters. EEG-based Brain Resuscitation Index (EBRI) may be the name of the equation that is obtained as a result of acquiring the relationships between EEG and end-tidal carbon dioxide tension and between the EEG and the cerebral blood flow, and formulating the results. The equation is then divided into an equation of the end-tidal carbon dioxide tension (EtCO2-EBRI) and an equation of the cerebral blood flow (CBF-EBRI) and stored in the control unit. The present invention may analyze the EEG in real time during operation, thus acquiring eight types of EEG parameters, and then calculate specific end-tidal carbon dioxide tension and cerebral blood flow through the EtCO2-EBRI and CBF-EBRI equations.

Meanwhile, in an embodiment of the present invention, an output unit may be additionally included, which outputs the patient's resuscitation state through the end-tidal carbon dioxide tension and the cerebral blood flow. The estimated end-tidal carbon dioxide tension and the cerebral blood flow, the real-time changes in the end-tidal carbon dioxide tension and the cerebral blood flow, and the real-time analysis result of variance may be output as graphs, numbers, and symbols through the output unit.

The calculated end-tidal carbon dioxide tension and cerebral blood flow may predict the future situation through a moving average processing. The length of the moving average may be set to a value of 3 seconds, 5 seconds, 7 seconds, or the like. After calculating, in real time, the calculated variance in the end-tidal carbon dioxide tension and the cerebral blood flow, the moving average processing may be performed to predict the future situation through the results. For example, when the result of the moving average processing has a positive value, it may be predicted that the end-tidal carbon dioxide tension or the brain blood flow of the patient will increase, while, when the result of moving average processing has a negative value, it may be predicted that the estimated value will continue to decrease. If the estimated value by the moving average processing is significantly different from the actual end-tidal carbon dioxide tension or the cerebral blood flow, the medical staff may be informed of the situation by means of a warning sound, or the like.

In addition, a warning unit may be included, which generates a warning when the end-tidal carbon dioxide tension and the cerebral blood flow are out of a set range. In this case, it may be determined that body circulation is not properly performed, and thus a warning sound may be generated through a buzzer or the like.

Hereinafter, a method for driving an apparatus for measuring brain cell activity according to an embodiment of the present invention will be described in detail with reference to the accompanying drawings.

Figure 4:
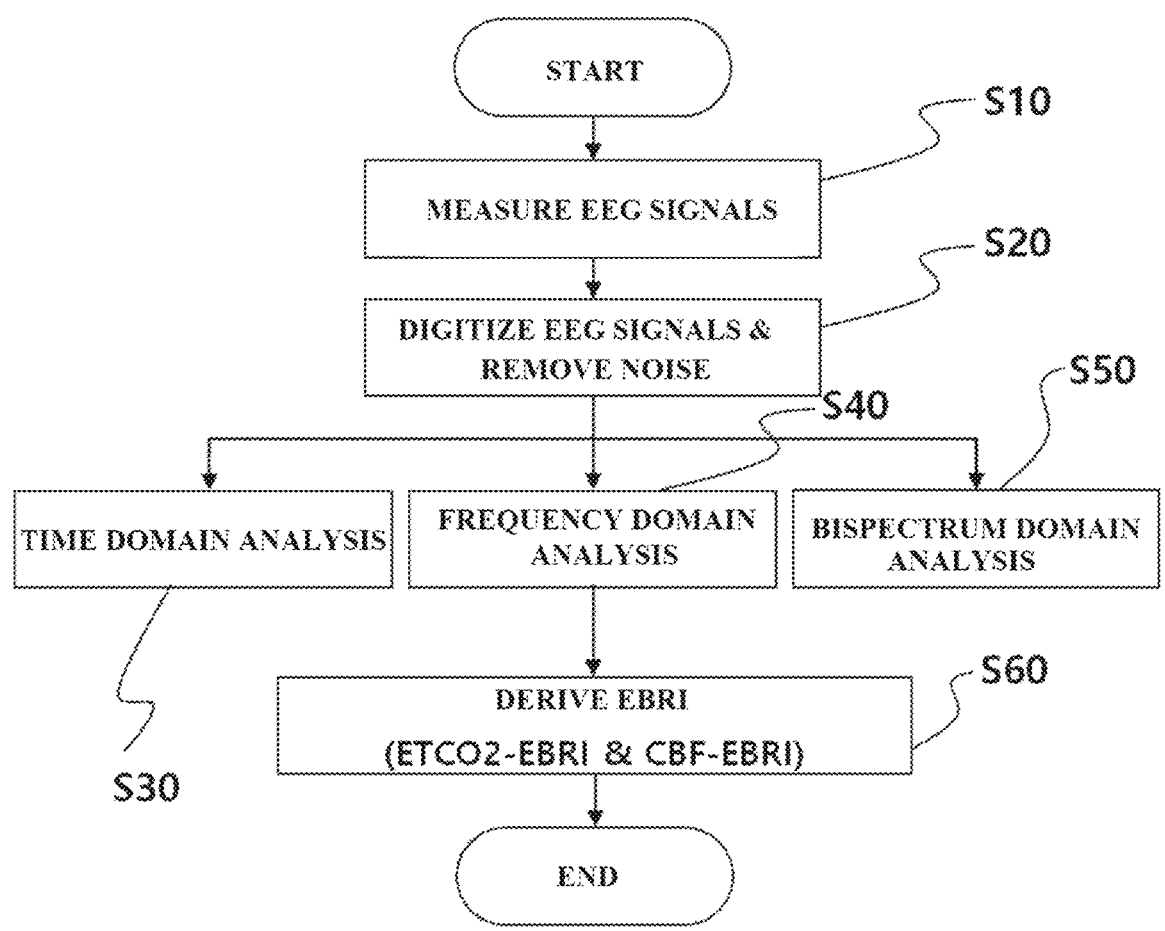
FIGS. 4 to 8 are flow charts showing a process of evaluating a degree of activity of brain cells using EEG, end-tidal carbon dioxide tension and cerebral blood flow according to an embodiment of the present invention.

FIG. 4 is a flowchart showing a method for driving a device for measuring brain cell activity according to an embodiment of the present invention.

As shown in FIG. 4, the measuring unit 10 measures the EEG signals (S10), and the ADC 20 converts the analog EEG signals measured at the measuring unit 10 into digital signals (S20).

The EEG signals converted into the digital signals are passed through the band pass filter 30 so that only the EEG signals of a specific frequency band (0.5 to 47 Hz) are extracted. In addition, in order to remove the 60 Hz power supply noise, the EEG signals converted into the digital signals are passed through the band blocking filter 40.

The digital EEG signals are segmented and analyzed in units of a predetermined length, and the segmented digital EEG signals are subjected to one or more of preprocessing process selected from among the time domain and frequency domain preprocessing processes to calculate the EEG parameters.

Figure 5:
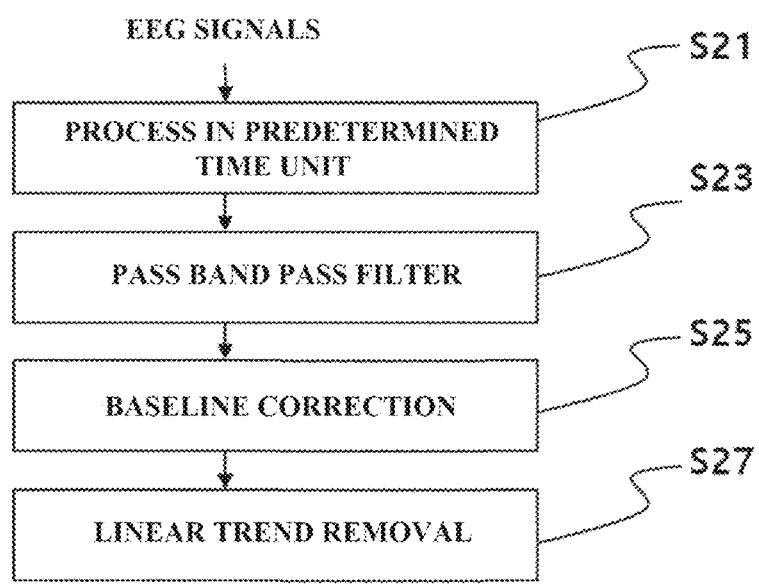

Referring to FIG. 5, the control unit 50 segments and processes successive EEG signals by a designated unit time slice (S21). User may segment and analyze on the basis of a unit time of a specific time length, such as, 2 seconds, 4 seconds, and so on. The EEG signals corresponding to the segmented unit time slice are passed through the band pass filter (S23). The cutoff frequency of the filter may be changed as needed. In order to remove the baseline and linear trend components that can remain despite the use of the bandpass filter 30, baseline correction (S25) and linear trend removal (S27) processes are additionally performed as the time domain preprocessing processes. As a result, the preprocessing processes of EEG signals are completed.

The control unit 50 calculates, from the digital EEG signals that have passed through the band pass filter 30 and the band blocking filter, the burst suppression ratio (BSR), the delta ratio, the beta ratio, the 95% power spectrum frequency (SEF95), the ratio of gamma power to total power spectral power (GammaPR), and the ratio of theta power to total power spectral power (ThetaPR), the power ratio of a high frequency component of 40 Hz or higher to total power spectral power (ExtraPR), and the degree of phase matching (SynchFastSlow).

First, the control unit 50 analyzes the digital EEG signals in time domain to calculate the burst suppression ratio (BSR) (S30). That is, the control unit 50 may determine the brain resuscitation state of the patient by calculating the ratio of silence (BSR) and magnitude within the unit time slice of the EEG from the time domain of the EEG signals.

Figure 6:
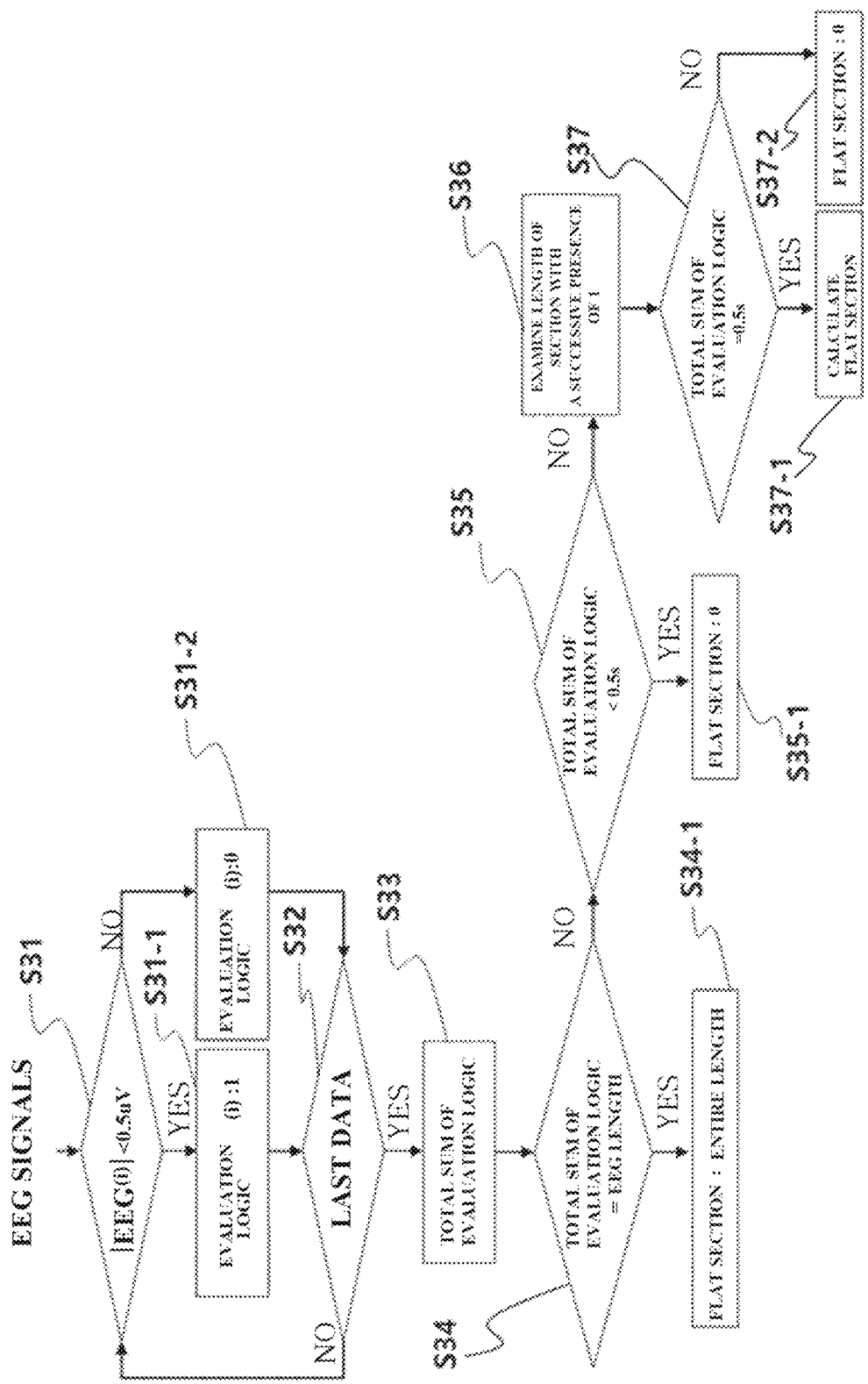

Referring to FIG. 6, the ratio of flat EEG that is continuously maintained below ±0.5 uV in the noise-removed EEG signals is calculated. For convenience in the calculation process, the magnitude of the EEG signals is monitored such that an evaluation logic arrangement is configured to replace a point with 1 where an absolute value is less than 0.5 uV, and replace a point with 0 where the absolute value is not less than 0.5 uV (S31, S31-1, S31-2, S32). The ratio of the flat EEG may be calculated by adding up all the components of the evaluation logic (S33). For example, when the size of all sections is less than ±5 uV, it means that all components of the evaluation logic are 1, so the sum corresponds to the total length of the unit time slices (S34, S34-1). When the sum of the evaluation logic is less than 0.5 second, it means that there will be no section less than ±0.5 uV for 0.5 second or longer, so the length of the flat EEG is 0 (S35, S35-1). If it is neither of the above two cases, then a section with a successive presence of 1 may be determined to specify the length of the flat EEG, and the BSR, which is the ratio with respect to the entire section, may be acquired (S36, S37, S37-1, S37-2).

The control unit 50 converts the EEG signals into frequency domain signals by Fourier transforming (FFT) the digital EEG signals. The control unit 50 calculates, from the EEG signals converted into the frequency-domain signals, sub-parameters of the delta ratio, the beta ratio, the 95% power spectrum frequency (SEF95), the ratio of gamma power to total power spectral power (GammaPR), the ratio of theta power to total power spectral power (ThetaPR), and the power ratio of a high frequency component of 40 Hz or higher to total power spectral power (ExtraPR) (S40).

That is, the control unit 50 calculates the power for each frequency of the EEG from the frequency spectrum acquired through Fourier transform. Then, the magnitude of the power spectrum in a specific band is calculated and compared with the values of the power spectrum in other bands to calculate the parameters.

Figure 7:
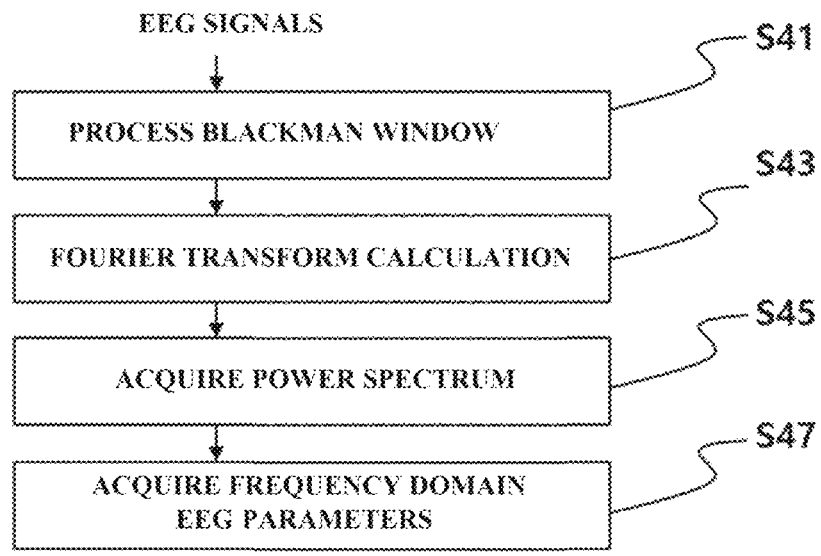

Referring to FIG. 7, a Blackman window is applied to the EEG signals that have been subjected to the preprocessing processes (S41), thereby preventing a distortion that may occur due to a time slice of a limited length. In addition, a power spectrum may be acquired (S45) through Fourier transform (S46), and parameters of a frequency domain may be calculated through sum and ratio of a specific frequency band (S47).

The control unit 50 calculates a degree of phase matching (SynchFastSlow) using a bispectral method defined as a two-dimensional power spectrum (S50).

Figure 8:
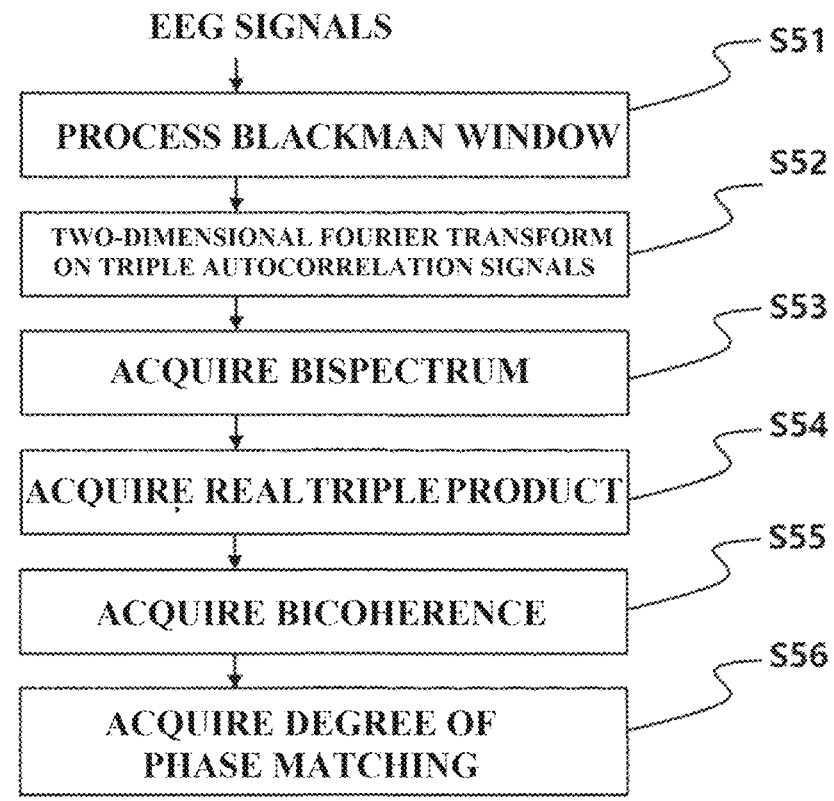

Referring to FIG. 8, a Blackman window is applied to the preprocessed EEG signals (S51), and a bispectrum is acquired (S53) by performing a two-dimensional Fourier transform on the triple autocorrelation signals (S52). Since the bispectrum reflects not only the nonlinear change of the EEG signal but also the amplitude of the signal, it is necessary to perform normalization to monitor only the change in phase. Therefore, the Real Triple Product (RTP), which is bispectrum calculated by adjusting the phase of all elements in the signals to 0, is acquired (S54) and the square root of the RTP in the bispectrum is divided, so that the normalized bispectrum bicoherence may be acquired (S55). Through this process, the SynchFastSlow may be calculated (S56).

The control unit 50 calculates the end-tidal carbon dioxide tension (EtCO2) and the cerebral blood flow from the four types of previously-obtained EEG parameters (S60). Linear or nonlinear regression equations may be used, and regression technique using machine learning and deep learning techniques may be used. Alternatively, a classification technique may be used.

As described above, the end-tidal carbon dioxide tension and the cerebral blood flow are calculated by establishing a statistical model derived from the previously-calculated EEG parameters and then determining weights to be applied to each parameter. Specifically, through the stepwise regression, which is a method of examining the importance of the parameters to be used in the regression model among various explanatory parameters (independent parameters) and removing insignificant parameters, or through the Least Absolute Shrinkage and Selection Operator (LASSO) regression analysis that complements the independence between the explanatory parameters through the process of adding or dropping parameters when there is a correlation between the explanatory parameters, the relationships between the EEG parameters and the end-tidal carbon dioxide tension and between the EEG and the cerebral blood flow may be determined and expressed by the equation defined as EBRI.

The control unit may output, through the output unit, a variance of the calculated end-tidal carbon dioxide tension and cerebral blood flow, or estimate a future change pattern through a moving average processing. Alternatively, when the calculated end-tidal carbon dioxide tension is out of the set range, a warning may be generated. The calculated end-tidal carbon dioxide tension and cerebral blood flow values may be transmitted to and stored in a networked computer system.

The output unit includes a storage device. In addition, the output unit may transmit data to an external device through a communication port. To this end, communications such as UART, USB, CAN, and TCP/IP may be set at the output unit. The output unit may generate analog voltage signals proportional to the end-tidal carbon dioxide tension and cerebral blood flow values through a digital-to-analog converter (DAC). In this case, shielded wires may be directly connected.

As described above, in the artificial circulation situation, the end-tidal carbon dioxide tension and the cerebral blood flow may be calculated through EEG measurement and analysis and provided, thereby enabling immediate determination of the effect of the artificial circulation. In addition, it is possible to provide optimal circulation conditions through the end-tidal carbon dioxide tension and the cerebral blood flow, thereby increasing the survival rate of the patients.

Various embodiments described herein may be implemented in a computer-readable recording medium or a recording medium readable with a device similar to the computer, using software, hardware, or a combination thereof, for example. That is, the control unit may be combined with the EEG measurement control unit to be manufactured as an integrated unit, or may be manufactured as a separate unit. It may be configured as a software application in a general-purpose PC, a micro PC, an embedded PC, a tablet PC, a stick PC, and the like.

When the control unit is configured as a unit separate from the PC, programming logic may be designed in a hardware design language in application specific integrated circuits (ASICs), programmable logic devices (PLDs), field programmable gate arrays (FPGAs), and the like. When the control unit is configured as a unit separate from the PC, programming logic of the firmware stage may be configured through digital signal processors (DSPs), digital signal processing devices (DSPDs), micro-controllers, microprocessors, and the like.

According to a hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

According to a software implementation, embodiments such as procedures and functions described herein may be implemented with separate software modules. Each of the software modules may perform one or more of the functions and operations described herein. Software code may be implemented in a software application written in an appropriate programming language.

Meanwhile, according to an embodiment of the present invention, the apparatus for measuring brain cell activity described above may be implemented with a computer program including a series of instructions for performing a method or an apparatus. That is, the present invention may be a computer program running on a certain operating system, for example, a mobile operating system, and the program may perform a process according to the series of instructions so that the method according to the present invention is implemented.

Another embodiment of the present invention may be various types of memories, such as floppy disk, CD, DVD, hard disk memory, SD card, XD card, flash memory, RAM, ROM, USB storage media, and the like in which the computer program is stored, and a computer-readable recording medium or a recording medium readable with an electronic device similar to the computer, and a computer or similar electronic device such as a smart phone or the like, which reads the computer program in the recording medium, can perform the method according to the present invention according to the series of instructions on the computer program.

The digitized EEG signals data may be transmitted by using wired or wireless communications, and shielded wires may also be directly connected for a transmission of analog signals.

Although the preferred embodiments of the present invention have been described as described above, the present invention is not limited thereto, and it goes without saying that it is possible to carry out various modifications within the scope of the appended drawings and the detailed description of the claims and the invention, which also falls within the scope of the present invention.

INDUSTRIAL APPLICABILITY

In a cardiac arrest state of a critically ill patient whose heart that is in charge of systemic blood circulation in the human body fails to function, the invention can be used to calculate the end-tidal carbon dioxide tension through the EEG analysis which involves measuring, in real time, the brain cell activity in the artificial blood circulation state using EEG and calculating the cerebral blood flow, thereby evaluating the effects of artificial circulation and inducing high cerebral blood flow.

What is claimed is:

1. An apparatus for measuring brain cell activity in artificial blood circulation, comprising: a measuring circuit (10) that measures electroencephalograph (EEG) signals; an analog-to-digital converter (ADC) (20) that converts the EEG signals measured at the measuring circuit (10) into digital signals; a control circuit (50) that calculates EEG parameters from the digital EEG signals converted at the ADC (20), and calculates an end-tidal carbon dioxide tension in blood undergoing artificial circulation and a cerebral blood flow from the EEG parameters; and an output circuit that generates a brain cell activity of a patient through the end-tidal carbon dioxide tension and the cerebral blood flow, or calculates a variance of the calculated end-tidal carbon dioxide tension and cerebral blood flow and a quality of a current purification process, or predicts a future situation through a moving average processing of the variance; wherein the control circuit (50) establishes a statistical model capable of determining a relationship between the EEG parameters and the end-tidal carbon dioxide tension and the cerebral blood flow, and then scores the EEG parameters, and then combines results of the scoring to calculate the end-tidal carbon dioxide tension, and generates a warning indicating that body circulation is not properly performed when the calculated end-tidal carbon dioxide tension is out of a set range, wherein the statistical model comprises an EEG-based Brain Resuscitation Index (EBRI) equation that is divided into an equation of the end-tidal carbon dioxide tension (EtCO2-EBRI) and an equation of the cerebral blood flow (CBF-EBRI) and stored in the control circuit (50), wherein the control circuit (50) calculates specific end-tidal carbon dioxide tension and cerebral blood flow through the EtCO2-EBRI and CBF-EBRI equations, and wherein the digital EEG signals are segmented and analyzed in units of a predetermined length, and the segmented digital EEG signals are subjected to one or more preprocessing processes selected from among time domain and frequency domain preprocessing processes to calculate the EEG parameters.

2. The apparatus according to claim 1, further comprising:
a band pass filter (30) that passes a signal of 0.5 to 47 Hz frequency band among the digital EEG signals converted through the ADC (20); and
a band blocking filter (40) that blocks a signal among the digital EEG signals converted through the ADC (20), the blocked signal being other than a band passed through the band pass filter.

3. An apparatus for measuring brain cell activity in artificial blood circulation, comprising: a measuring circuit (10) that measures electroencephalograph (EEG) signals; an analog-to-digital converter (ADC) (20) that converts the EEG signals measured at the measuring circuit (10) into digital signals; a control circuit (50) that calculates EEG parameters from the digital EEG signals converted at the ADC (20), calculates an end-tidal carbon dioxide tension in blood undergoing artificial circulation and a cerebral blood flow from the EEG parameters, and generates a warning indicating that body circulation is not properly performed when the calculated end-tidal carbon dioxide tension is out of a set range; and an output circuit that generates a brain cell activity of a patient through the end-tidal carbon dioxide tension and the cerebral blood flow, or calculates a variance of the calculated end-tidal carbon dioxide tension and cerebral blood flow and a quality of a current purification process, or predicts a future situation through a moving average processing of the variance; wherein the EEG parameters comprise a burst suppression ratio (BSR), a delta ratio, a beta ratio, a 95% power spectrum frequency (SEF95), a ratio of gamma power to total power spectral power (GammaPR), a ratio of theta power to total power spectral power (ThetaPR), a power ratio of a high frequency component to total power spectral power (ExtraPR), and a degree of phase matching (SynchFastSlow); wherein the burst suppression ratio (BSR) represents a ratio of silence within a unit time slice of an EEG on a time domain, the delta ratio represents a ratio of a sum of spectral powers of 1 to 4 Hz frequency band of the EEG with respect to a sum of spectral powers of 8 to 20 Hz frequency band of the EEG, on a frequency domain, the beta ratio represents a ratio of a sum of spectral powers of a specific frequency band of the EEG with respect to a sum of spectral powers of another specific frequency band of the EEG, on a frequency domain, the 95% power spectrum frequency (SEF95) represents a sum of frequency spectral powers calculated in a direction increasing from a starting frequency of a frequency bandwidth of EEG on a frequency domain, and represents a frequency corresponding to 95% of the total frequency spectral power, the ratio of gamma power to total power spectral power (GammaPR) represents a ratio of a sum of spectral powers of 0.5 to 47 Hz frequency band of the EEG with respect to a sum of spectral powers of 30 to 47 Hz frequency band of the EEG, on a frequency domain, the ratio of theta power to total power spectral power (ThetaPR) represents a ratio of a sum of spectral powers of 0.5 to 47 Hz frequency band of the EEG with respect to a sum of spectral powers of 4 to 8 Hz frequency band of the EEG, on a frequency domain, the power ratio of a high frequency component to total power spectral power (ExtraPR) represents a ratio of a sum of spectral powers of a specific frequency band of the EEG with respect to a sum of spectral powers of 40 to 47 Hz frequency band of the EEG, which is different from the GammaPR, on a frequency domain, and the degree of phase matching (SynchFastSlow) represents a ratio of a sum of bispectral powers of 0.5 to 47 Hz frequency band of the EEG with respect to a sum of bispectral powers of 40 to 47 Hz frequency band of the EEG, on a bispectral domain.

4. A method of measuring brain cell activity in artificial blood circulation, performed at an apparatus for measuring brain cell activity comprising a measuring circuit that measures electroencephalograph (EEG) signals, an analog-to-digital converter (ADC), and a control circuit, the method comprising: measuring EEG signals with the measuring circuit; converting the EEG signals into digital signals through the ADC; calculating, with the control circuit, EEG parameters from the converted digital EEG signals; and calculating, with the control circuit, an end-tidal carbon dioxide tension in blood undergoing artificial circulation and a cerebral blood flow from the EEG parameters; wherein the calculating the end-tidal carbon dioxide tension and the cerebral blood flow from the EEG parameters comprises establishing a statistical model capable of determining a relationship between the EEG parameters and the end-tidal carbon dioxide tension and the cerebral blood flow, scoring the EEG parameters, combining results of the scoring to calculate the end-tidal carbon dioxide tension, and generating a warning indicating that body circulation is not properly performed when the calculated end-tidal carbon dioxide tension is out of a set range; wherein the statistical model comprises an EEG-based Brain Resuscitation Index (EBRI) equation that is divided into an equation of the end-tidal carbon dioxide tension (EtCO2-EBRI) and an equation of the cerebral blood flow (CBF-EBRI) and stored in the control circuit, wherein the control circuit calculates specific end-tidal carbon dioxide tension and cerebral blood flow through the EtCO2-EBRI and CBF-EBRI equations, wherein the digital EEG signals are segmented and analyzed in units of a predetermined length, and the segmented digital EEG signals are subjected to one or more preprocessing processes selected from among time domain and frequency domain preprocessing processes to calculate the EEG parameters, and wherein the apparatus for measuring brain cell activity further comprises an output circuit, and the method further comprises: generating, through the output circuit, the end-tidal carbon dioxide tension and the cerebral blood flow, or calculating a variance of the calculated end-tidal carbon dioxide tension and cerebral blood flow and generating a quality of a current purification process, or predicting a future situation through a moving average processing of the variance.

5. The method according to claim 4, further comprising: passing, through a band pass filter (30), a signal of 0.5 to 47 Hz frequency band among the digital EEG signals converted through the ADC; and blocking, through a band blocking filter (40), a signal among the digital EEG signals converted through the ADC, the blocked signal being other than the frequency band passed through the band pass filter.

6. The method according to claim 4, wherein the digital EEG signals are segmented and analyzed in units of a predetermined length, and the segmented digital EEG signals are subjected to one or more preprocessing processes selected from among time domain and frequency domain preprocessing processes to calculate the EEG parameters.

7. The method according to claim 4, wherein the EEG parameters comprise a burst suppression ratio (BSR), a delta ratio, a beta ratio, a 95% power spectrum frequency (SEF95), a ratio of gamma power to total power spectral power (GammaPR), a ratio of theta power to total power spectral power (ThetaPR), a power ratio of a high frequency component to total power spectral power (ExtraPR), and a degree of phase matching (SynchFastSlow);
  wherein
  the burst suppression ratio (BSR) represents a ratio of silence within a unit time slice of an EEG on a time domain,
  the delta ratio represents a ratio of a sum of spectral powers of 1 to 4 Hz frequency band of the EEG with respect to a sum of spectral powers of 8 to 20 Hz frequency band of the EEG, on a frequency domain,
  the beta ratio represents a ratio of a sum of spectral powers of a specific frequency band of the EEG with respect to a sum of spectral powers of another specific frequency band of the EEG, on a frequency domain,
  the 95% power spectrum frequency (SEF95) represents a sum of frequency spectral powers calculated in a direction increasing from a starting frequency of a frequency bandwidth of EEG on a frequency domain, and represents a frequency corresponding to 95% of the total frequency spectral power,
  the ratio of gamma power to total power spectral power (GammaPR) represents a ratio of a sum of spectral powers of 0.5 to 47 Hz frequency band of the EEG with respect to a sum of spectral powers of 30 to 47 Hz frequency band of the EEG, on a frequency domain,
  the ratio of theta power to total power spectral power (ThetaPR) represents a ratio of a sum of spectral powers of 0.5 to 47 Hz frequency band of the EEG with respect to a sum of spectral powers of 4 to 8 Hz frequency band of the EEG, on a frequency domain,
  the power ratio of a high frequency component to total power spectral power (ExtraPR) represents a ratio of a sum of spectral powers of a specific frequency band of the EEG with respect to a sum of spectral powers of 40 to 47 Hz frequency band of the EEG, which is different from the GammaPR, on a frequency domain, and
  the degree of phase matching (SynchFastSlow) represents a ratio of a sum of bispectral powers of 0.5 to 47 Hz frequency band of the EEG with respect to a sum of bispectral powers of 40 to 47 Hz frequency band of the EEG, on a bispectral domain.

8. The method according to claim 4, wherein the method further comprises:
  generating the warning through a warning circuit, when the end-tidal carbon dioxide tension and the cerebral blood flow are out of a set range.

* * * * *